Sept. 17, 1946.   V. E. PRATT   2,407,902
CAMERA
Original Filed Jan. 3, 1942   4 Sheets-Sheet 2
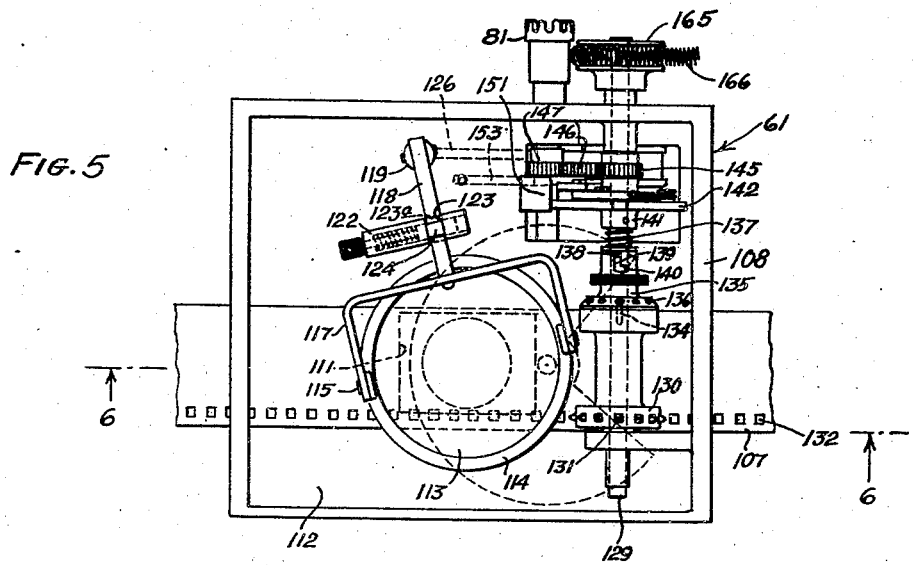
FIG. 5
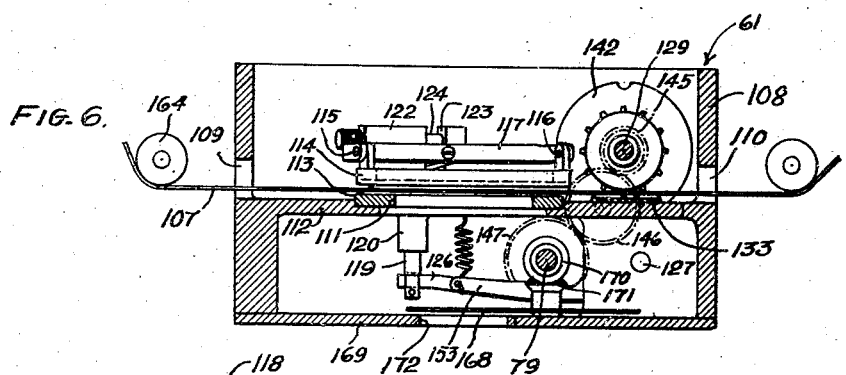
FIG. 6.
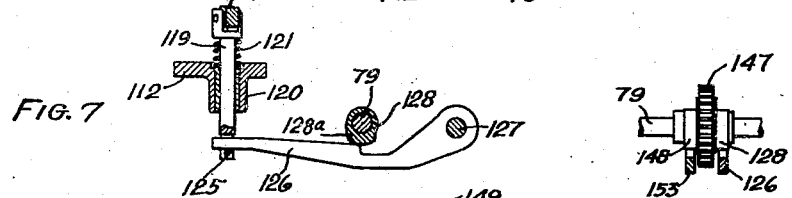
FIG. 7
FIG. 9
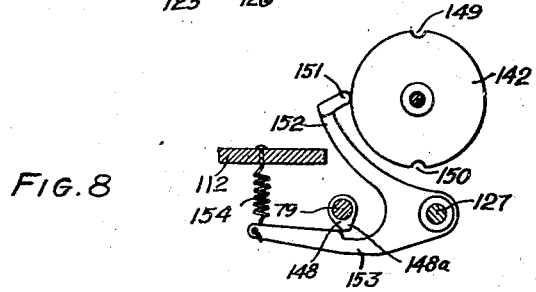
FIG. 8
INVENTOR
VERNEUR E. PRATT
BY
Van Deventer & Grier
ATTORNEYS Sept. 17, 1946.                    V. E. PRATT                        2,407,902
                                    CAMERA
                Original Filed Jan. 3, 1942            4 Sheets-Sheet 3
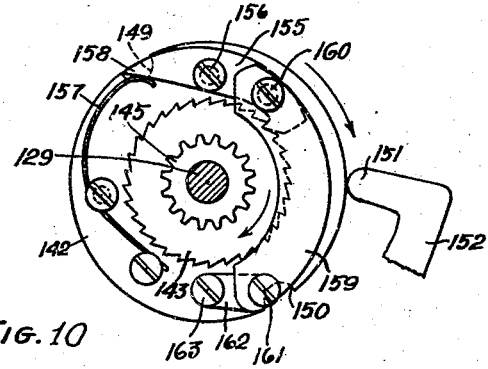
FIG.10
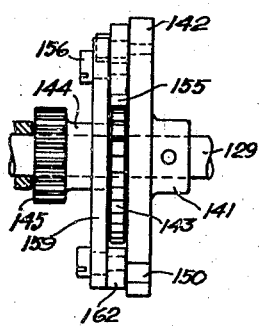
FIG.11
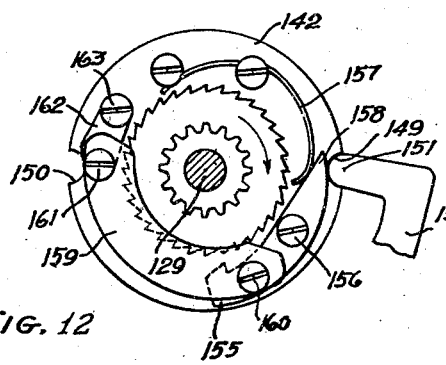
FIG.12
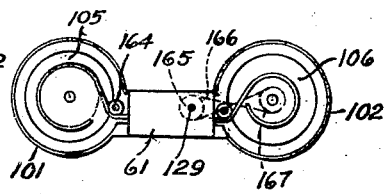
FIG.13
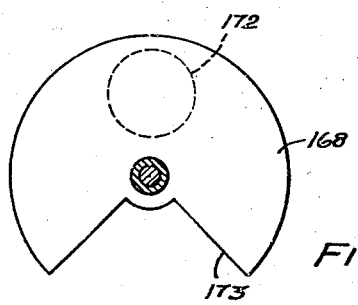
FIG.14
FIG.15
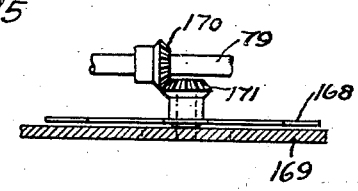
INVENTOR
VERNEUR E. PRATT.
BY
Van Deventer + Grier
ATTORNEYS Patented Sept. 17, 1946

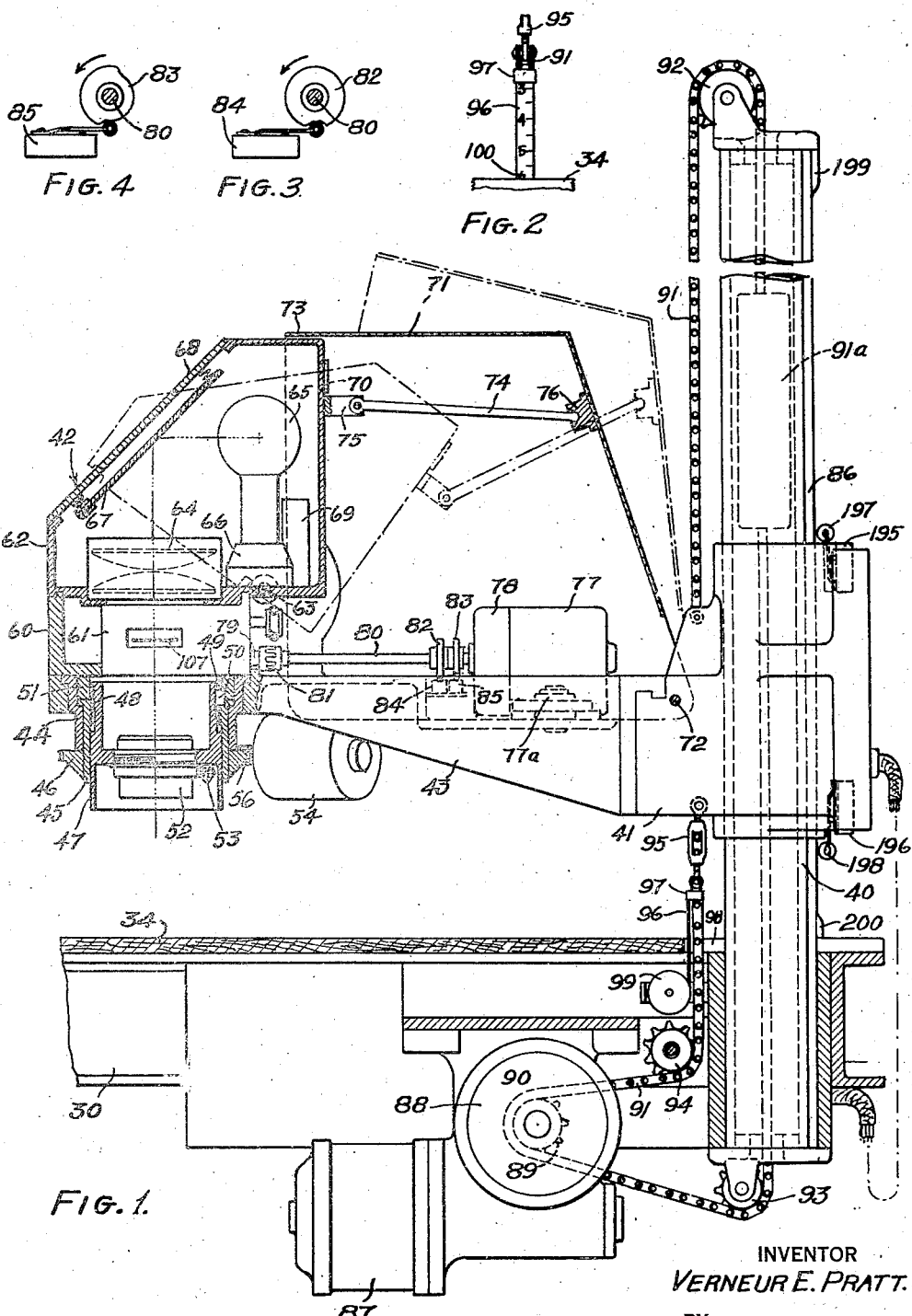

2,407,902

UNITED STATES PATENT OFFICE 2,407,902

CAMERA

Verneur E. Pratt, Norwalk, Conn., assignor to Microstat Corporation, a corporation of Delaware Original application January 3, 1942, Serial No. 425,528. Divided and this application July 1, 1943, Serial No. 493,034

3 Claims. (Cl. 88—23)

The present invention pertains to improvements in photographic and reproducing apparatus.

An object of the invention is to provide improved means for recording drawings, maps, documents and the like on photographic film, such as microfilm.

Another object is to provide improved apparatus of the above nature including means to reproduce the photographed drawings, etc., by direct enlargement.

A further object is to provide an improved camera-projector adapted to photograph data as noted and to reproduce the same through the same lens with identical setting, whereby any possible aberration in recording is automatically corrected in reproduction.

Another object is to provide a camera-projector of the above type having improved means to index, register and expose the film.

Another object is to provide a suitable object table platen and improved means to support the same and the camera in rigid mutual relationship, whereby possible vibrational flexings between them are substantially eliminated and if any vibration is present the table and camera vibrate together as a unit.

A further object is to provide improved illuminating means for the object table.

Another object is to provide improved power and control means by which elevation and lowering of the camera, adjustment of the lens focus, actuation of the indexer and shutter, and the various other operational functions are readily carried out by remote control from a single operator's station.

Other objects and advantages of the invention will become evident during the course of the following description, in connection with the accompanying drawings, in which—

Figure 1 is a vertical side view of the camera-projector and related apparatus partly in section;

Figure 2 is a detail view of the elevation indicating scale;

Figure 3 is a detail view of the exposure motor holding switch and cam;

Figure 4 is a similar view of the cam and switch for controlling open shutter warning light during picture taking;

Figure 5 is a detail plan view of the film gate, indexing, registering and shutter structure;

Figure 6 is a vertical detail view of the same partially on the lines 6—6, Figure 5;

Figure 7 is a detail view of the pressure plate control cam, lever and plunger;

Figure 8 is a detail view of the indexing cam, lever and plate;

Figure 9 is a detail side view of the camshaft gear and cams;

Figure 10 is an enlarged detail rear view of the indexing clutch mechanism in engaged or driving position;

Figure 11 is a side view of the same;

Figure 12 is a rear view of the same in released or indexed position;

Figure 13 is a diagrammatic illustration of the film reels and take-up drive;

Figure 14 is a plan view of the shutter;

Figure 15 is a detail side view of the same, showing the driving gears; and

Figure 16:
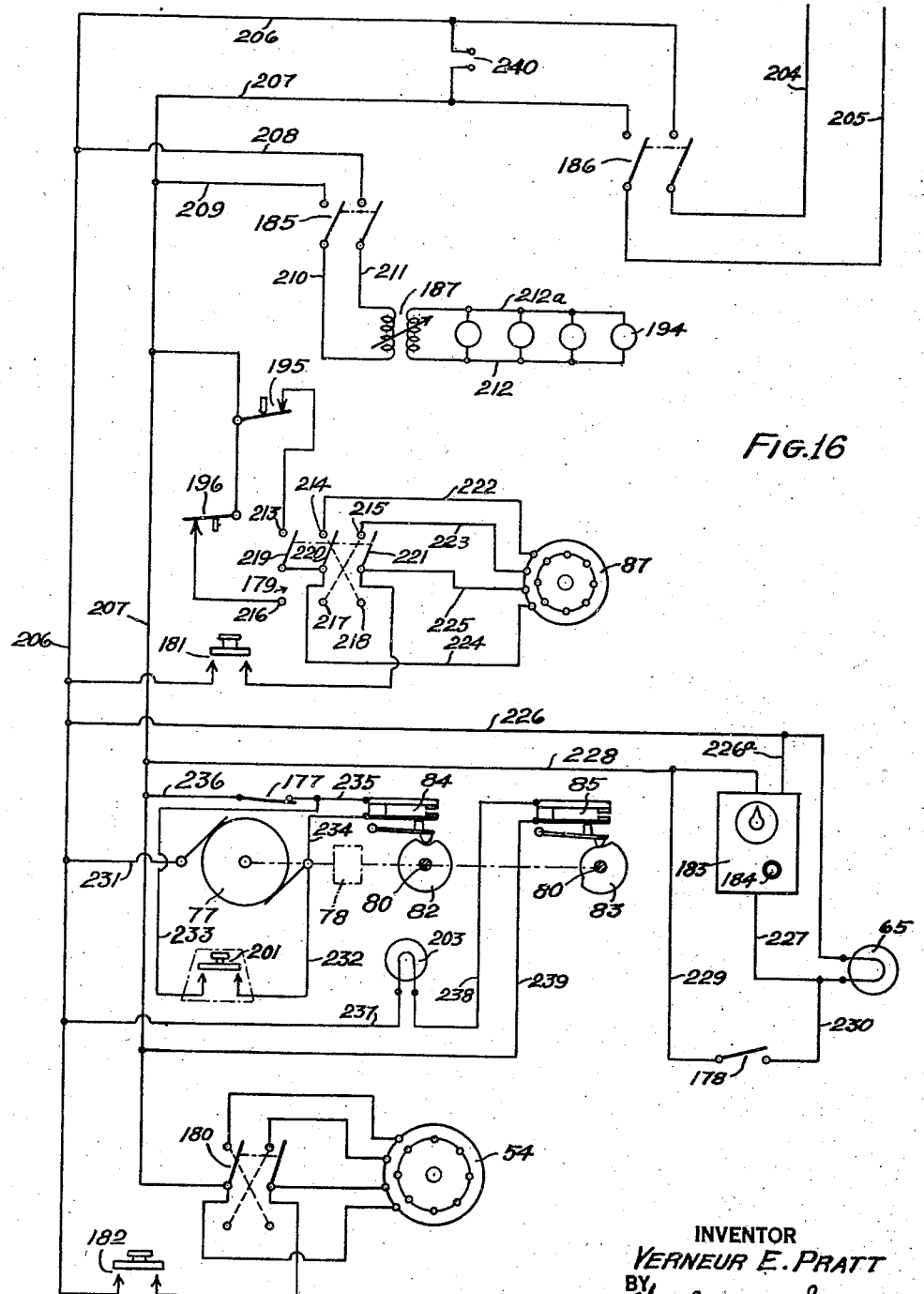
Figure 16 is a wiring diagram of the various electrical apparatus embodied in the invention.

This application is a division of application, Serial No. 425,528, filed January 3, 1942, now Patent No. 2,369,247, dated Dec. 13, 1945.

Referring to Figure 1, the camera-projector 42 has a main base or bed plate 43. A stepped vertical sleeve 44 is secured in the front end of the base 43 and has rotatably mounted therein, a second sleeve 45 on the lower end of which is secured a worm-gear ring 46. A cylindrical lens barrel 47 is threaded at 48 inside the second sleeve 45, and has a longitudinal slot 49 engaging a suitable key 50 in a stationary ring 51 secured in the upper end of the outer sleeve 44. A suitable lens assembly 52, having a lever 53 for adjustment of the usual iris diaphragm (not shown), is mounted in the barrel 47.

A reversible motor 54, mounted on the bottom of the camera base 43, has on its shaft a worm 56 meshing with the gear ring 46.

From the foregoing description it will be evident that when the motor 54 is operated the worm 56 revolves the gear ring 46 and with it the sleeve 45. The barrel 47 being threaded in sleeve 45 but restrained from rotation by the stationary key 50, rotation of sleeve 45 feeds the barrel 47 and with it the lens assembly 52 upward or downward depending on the direction of rotation of the motor 54. Thus the motor 54 is adapted to adjust the focus of the lens assembly 52, each revolution of the motor changing the lens position by a definite small increment pre-determined by the lead of the thread 48 and the reducing ratio of the worm 56 and gear 46; for example, an increment of .00025 inch.

Removably disposed in the central portion 60 of the camera-projector 42 is a film-control and shutter sub-assembly 61, shown in detail in Figures 5 to 15, and to be presently described.

A lamp housing 62 is horizontally pivoted at 63 and normally engages the top of the central portion 60 in light-tight relationship. A condensing lens system 64 is secured in the bottom of the housing 62 in optical alignment with the projection or photographic lens 52. A lamp 65 is mounted in a socket 66 in the rear end of the housing 62. An inclined mirror 67 is adjustably secured to the upper front wall 68 of the housing in position to direct light from the lamp 65 to the condensing lens system 64, thence through the sub-assembly 61 and projection lens 52. Ventilation for the lamp 65 is provided by a pipe 69 leading up through the bottom of the housing 62 and suitable openings 70 in the rear thereof.

A light shield or hood 71 is pivoted at 72 to the carriage 41, the front upper end 73 of the hood normally overlying the rear top of the lamp housing 62. A rod 74 is horizontally pivoted at 75 to the rear of the housing 62, while the rear end of the rod engages a socket 76 secured to the back of the hood 71.

When the housing 62 is swung upward and rearwardly on its pivots 63 to allow access to the sub-assembly 61 as hereinafter set forth, the rod 74 swings the hood 71 upwardly as illustrated in dot and dash lines, Figure 1, thus providing ample clearance between the top of the housing and the hood.

A motor 77 having a suitable speed-reducing-gear head 78 is mounted in the base 43 and is adapted to drive the shaft 79 of the sub-assembly 61 through an extension shaft 80 and a jaw coupling 81. The extension shaft 80 carries two cams 82 and 83, shown in detail in Figures 3 and 4, these cams being adapted to respectively control switches 84 and 85 for purposes hereinafter set forth. Rubber vibration dampers 77a are provided in the mounting of motor 77.

The column 40 is provided with a longitudinal key 86 fitting in the rear portion of the carriage 41, thereby preventing any swinging motion of the carriage and camera-projector about the column.

A reversible motor 87, mounted under the frame 30, is provided with a worm-gear speed reducer 88 carrying on its output shaft 89 a sprocket 90. A roller chain 91 is secured to the upper portion of the carriage 41 and extends upward therefrom and over an idler sprocket 92 on the top of the column 40, thence downward through the interior of the column and around a second idler sprocket 93 to the drive sprocket 90, and thence via a third idler sprocket 94 to a turn-buckle 95 secured to the bottom of the carriage 41.

When the motor 87 is operated to drive the chain 91 the carriage and camera-projector assembly is raised or lowered along the column 40, and as the worm speed reducer 88 is of the irreversible drive type the latter acts as a lock to hold the carriage at any point of elevation when the motor is stopped. The turn-buckle 95 is operable to take up any slack in the chain. A heavy weight 91a is secured to the chain 91 inside the column 40 to serve as a counter-balance for the greater part of the weight of the carriage and camera-projector.

A measuring tape 96 has its free end clipped to the chain 91 at 97 just below the turn-buckle 95, the tape extending downward in front of the chain through a slot 98 in the table 34 and to a spring actuated retracting reel 99 of any suitable type secured under the table.

As the mechanisms of such reels are well known and form per se no part of the present invention, no further description is required herein. It is evident, however, that as the carriage is moved up or down the tape 96 unreels or re-reels through the slot 98 and the figures 100 (see also Figure 2) thereon serve as a visual indication of the height of the camera-projector above the table 34 as illustrated in Figure 2.

Referring to Figures 5 and 6, it will be seen that the sub-assembly 61 has a casing 108 provided with horizontal side slots 109 and 110 through which the film 107 is threaded. The film overlies a gate or circular mask 111 secured in a horizontal partition 112 in the casing 108. A transparent pressure plate 113, preferably of circular shape, is held in a frame 114 trunnioned at 115 and 116 to a yoke 117. The shank 118 of yoke 117 is loosely pivoted to the top of a plunger 119 vertically slidable in a boss 120 in the partition 112 as shown in detail in Figure 7, the plunger 119 being urged upward by a spring 121. A fulcrum block 122 has therein a slot 123 in which the shank 118 is retained by means of a normally retractible pin 124. The lower end of the plunger 119 is slotted and has therein a cross pin 125 supporting the end of a lever 126 which is fulcrumed on a stationary pivot pin 127. A cam 128 on the drive shaft 79 engages and is adapted to rock the lever 126 downward.

Normally the upward pressure of the spring 121, acts through the plunger 119, holds the shank 181 of yoke 117 against the retractible pin 124, the latter acting as a fulcrum and causing the trunnioned pressure plate 113 to press the film 107 downward against the gate 111. The trunnions 115 and 116, the free sliding and rocking permitted the shank 118 in the fulcrum slot 123, and the loose pivoting of the shank to the plunger 119, allow the pressure plate 113 to float into firm and even engagement throughout the entire underlying portion of the film 107, thus assuring accurate flatness of the latter across the gate 111.

When the cam 128 rocks the lever 126 downward during the operation of the device as hereinafter described, the plunger 119 is drawn downward against the pressure of spring 121. The shank 118 engages the curved bottom 123a of the slot 123 which acts as a fulcrum, causing the pressure plate 113 to be raised out of engagement with the film 107.

A second shaft 129, journalled in the casing 108 and hereinafter referred to as the sprocket shaft, has rotatably mounted thereon a sprocket spool 130, the latter having the usual teeth 131 engaging the perforations 132 of the film 107. A grooved shoe 133 underlies the sprocket 130 and keeps the film at all times in proper engagement with the sprocket teeth.

A horizontal drive pin 134 is secured in the rear end of the sprocket spool 130. An annular driving member 135, slidably mounted on the shaft 129, has a series of index holes 136 corresponding in number and circumferential spacing to the sprocket teeth 131, each hole being adapted to engage the pin 134 as shown in Figure 5. When so positioned the driving member 135 is held pressed in the described driving engagement with the pin 134 by a compression spring 137. A pin 138 in the shaft 129 engages a longitudinal slot 139 in the member 135, allowing the latter to be slid longitudinally on the shaft but normally preventing any rotary motion between these parts. A short circumferential extension 140 is provided in the front of the slot 139.

When it is desired to rotate the sprocket 130 manually, as in threading, adjusting or removing the film 107, the member 135 is slid rearwardly against the pressure of spring 137 until the front of the slot 139 encounters the pin 138, whereupon the member 135 is turned to hook the pin 138 in the circumferential extension 140 of the slot and thereby prevent forward sliding return of the driving member. By this operation the driving member 136 is withdrawn from and locked out of engagement with the pin 134, leaving the sprocket free to be manually revolved on the shaft 129. When manual adjustment is completed, the member 135 is returned to engagement with the sprocket hub by the reverse of the releasing operation described, the pin 134 entering any chosen hole 136 and assuming an accurately indexed setting.

The spring 137 is backed by the hub 141 of a clutch plate 142, the hub 141 being pinned to the sprocket shaft 129. To the rear of the plate 142 is a ratchet 143 having a hub 144 carrying a spur pinion 145 (Figures 5 and 11), the ratchet and gear combination being rotatably mounted on the shaft 129.

The pinion 145 meshes with an idler gear 146 which in turn meshes with a gear 147 secured to the drive shaft 79, the drive ratio in the present embodiment being one to two, i. e., one revolution of the drive shaft 79 drives the ratchet 143 through two revolutions. The gear 147 carries on its rear side the cam 128 as shown in detail in Figure 9. The gear also carries on its front side a second cam 148, the purpose of which will presently be explained.

The clutch plate 142 has in its periphery two oppositely spaced notches 149 and 150 (Figures 8, 10, 11 and 12), adapted to receive a detent 151 on the end of a lever 152 pivoted on the pin 127 (Figure 8).

A horizontal arm 153 of the lever 152 engages the second cam 148. A tension spring 154 urges the arm 153 upward to hold the detent 151 in engagement with the plate 142 except when the detent is withdrawn by action of the cam 148 as hereinafter set forth.

A pawl 155 is pivoted at 156 to the rear face of the plate 142 and is adapted to be rocked into engagement with the ratchet 143 by a spring 157 (Figures 10 and 12). The rear end 158 of the pawl 155 is disposed alongside the notch 149, so that when the detent 151 occupies the notch 149 as shown in Figure 16, it holds the pawl 155 out of engagement with the ratchet 143.

An arcuate link 159 is articulated at 160 to the pawl 155, and at 161 to a short second link 162 which is pivotally mounted at 163 on the plate 142. The joint 161 between links 159 and 162 is disposed beside the notch 150, so that when the detent 151 enters the notch 150 it presses the joined ends of the links inward, causing the links to operate as a toggle to force the pawl 155 out of engagement with the ratchet 143. Thus it will be seen that engagement of the detent 151 with either notch 149 or 150 releases the pawl 155 from the ratchet, while the detent, urged into the notch by the tension spring 154 (Figure 8), stops and holds the plate 142 in a pre-determined position, the ratchet 143 continuing to revolve on the shaft 129.

As the plate 142 is normally connected to the sprocket 130 via the shaft 129 and driving member 135, as previously described, the sprocket 130 and film 107 are thereby held accurately in index position as long as the detent 151 remains in one of the notches 149 or 150.

Once during each rotation of the drive shaft 79 (Figure 8), the cam 148 depresses the lever arm 153, thus withdrawing the detent 151 from whichever notch it has previously engaged, allowing the pawl 155 to engage the rotating ratchet 143 and thereby drive the plate 142 and sprocket 130.

When the comparatively narrow lobe 148ª of the cam 148 releases the lever arm 153, the detent 151 rides on the periphery of the plate 142 until the succeeding notch 149 or 150 moves into registry with the detent, when the latter again is forced into the notch by the spring 154 to again release the pawl 155 and stop the plate and sprocket as previously described.

From the foregoing, it is evident that once during each revolution of the drive shaft 79, the plate 142 and sprocket 130 are driven exactly one-half revolution, and the film 107 is consequently moved an index distance corresponding to one-half the pitch circumference of the sprocket 130, this distance equalling one frame spacing of the film. Since the ratchet 143 is driven at double the rotative speed of the drive shaft 79, as previously set forth, it is also evident that the movement of the film takes place during one-quarter revolution of the drive shaft 79.

The cam 128 (Figure 7) has a comparatively wide lobe 128ª which forces the lever 126 downward just prior to release of the detent 151 from its engaged notch and holds the lever 126 depressed during the described half-revolution of the sprocket 130.

By this means the pressure plate 113 (Figures 5 and 6) is raised and held clear of the film 107 while the latter is moved. In Figure 6, it will be observed that while released by the pressure plate 113, the film 107 is guided by the shoe 133 and a roller 164, the latter being disposed in the left-hand magazine 101 near the reel 105 as shown diagrammatically in Figure 13. The heights of the shoe 133 and roller 164 are such that when released as noted, the film 107 clears the gate 111. By this means the film is kept out of sliding contact with the gate during its movement, thus avoiding any possible abrasion.

A pulley 165 on the end of the sprocket shaft 129 (Figure 5) drives a spring friction belt 166 which in turn engages a second pulley 167 connected to the film reel 106 as shown diagrammatically in Figure 13, thus providing a yielding or slip take-up drive for the reel 106.

A disk shutter 168 (Figures 6, 14 and 15) is rotatably mounted on the bottom plate 169 of the sub-assembly casing 68, and is adapted to be driven at one-to-one ratio from the drive shaft 79 via mitre gears 170 and 171. The shutter 168 normally overlies and closes off a light opening 172 in the bottom plate 169 above the lens 52 and in optical alignment with the film gate 111.

By this means the shutter normally prevents passage of light between the lens and film. The shutter 168 has a cut-out portion or notch 173 extending throughout 90 degrees of arc in the embodiment illustrated.

During rotation of the shutter at constant speed, the passage of the notch 173 over the opening permits the passage of light from the lens to the film for a pre-determined exposure time, as hereinafter set forth. The gearing of the shutter to the shaft 79, of course is so arranged that the exposure takes place while the film 107 is stationary and held flat by the pressure plate 113.

Referring to the typical wiring diagram (Figure 16), the numerals 204 and 205 designate the conductors of a suitable source of A.-C. current supply, leading into the main or line switch 186, thence to distributing conductors 206 and 207.

Branches 208 and 209 lead to manual switch 185, hereinafter termed the light switch. From the output poles of the switch 185 wires 210 and 211 are connected to the variable transformer 187. The lamps 194 for illuminating the documents are connected in parallel between conductors 212 and 212ª from the output terminals of the transformer 187.

It will be seen from the above description that when the switches 186 and 187 are closed, the lamps 194 draw current and are illuminated, the voltage and consequently the intensity of the illumination being adjustable by means of the variable transformer 187.

The reversing switch 179 is of the three-pole double throw construction with a central "off" position. The switch has upper and lower contact points 213, 214, 215 and 216, 217, 218, respectively adapted to be alternately engaged by poles 219, 220 and 221, poles 219 and 220 being electrically joined together. Contacts 214 and 215 are respectively cross connected in the usual manner with contacts 217 and 218 for reversing the current direction through field connectors 222 and 223 leading to the elevating motor 87. Poles 220 and 221 have leads 224 and 225 comprising armature connections to the motor 87. Pole 221 is also connected via the normally open push-button switch 181 with the distributing conductor 206. Poles 213 and 216 are connected to the second conductor 207 respectively via the normally closed limit switches 195 and 196.

When the switch 179 is thrown to upper position and the push-button switch 181 is closed, the connection from conductor 206 is completed via switch 181, pole 221, to the motor armature lead 225, also via pole 221 and contact 215 to the field lead 223. At the same time current flows from the conductor 207 via limit switch 195, contact 213 and pole 219 to the pole 220, thence to the second armature lead 224, and via contact 214 to the second field lead 222. By this means the motor is energized to raise the carriage 41 (Figure 1).

When the switch 179 is thrown to downward position, the current connections to the armature leads 224 and 225 are the same as described except that the pole 219 received current from conductor 207 via limit switch 196 and lower contact 216 without any change in polarity. However, the field leads 222 and 223 now receive their current from poles 221 and 220 respectively through the cross connected contacts 218 and 217 respectively. The motor field is thereby reversed, causing the motor 87 to revolve in the reverse direction and lower the carriage 41.

If during upward driving operation of the motor 87 the limit switch 196 is opened, the described supply from conductor 207 is broken causing the motor 87 to stop. Thereafter, current can be restored only by throwing the switch downward to complete the connection through the second or lower limit switch 196, whereupon closure of the button switch 181 again energizes the motor in the downward driving direction.

Similarly, if the lower limit 196 switch is opened to stop the motor, the latter can only be energized after throwing the switch 179 to upward driving position.

By the above described means, it will be seen that engagement of either limit switch with its operating abutment 199 or 200 stops the progress of the carriage 41, but the latter may be thereafter moved away from the extreme or limit position after reversing the switch 179.

Returning to Figure 16, a branch lead 226 connects one side of the projection lamp 65 with the distributing conductor, while the other side of the lamp is adapted to be connected via a lead 227, the time switch 183, and a second lead 228 to the second distributing conductor 207. A manual switch 178 is shunted across the time switch 183 by means of wires 229 and 230. Thus when switch 178 is closed, the lamp 65 remains energized irrespective of the time switch 183.

The time switch 183 is preferably of the well-known electrically actuated type, a branch 226ª being provided to supply a current connection from 206 to the actuating mechanism under control of the button 184. The shutter motor 77 is connected on one side via a lead 231 to the conductor 206. A wire 234, from the second side of the motor 77, is connected to the normally open cam switch 84 (Figures 1 and 3) thence via lead 235, the toggle switch 177, and a lead 236 to the conductor 207. Also, from the other or second side of the motor 77, a wire 232 is connected to the normally open foot switch 201, which latter is in turn connected via lead 233 to the lead 235.

From the above connections, it is evident that the motor 77 may be energized through either one of two parallel circuit-closing means, that is via the foot-switch 201 or via the cam switch 84 and manual switch 177, which latter is normally kept closed during photographing operation. The cam 82, as previously set forth, is secured on the low-speed geared output shaft 80 of the motor 77. The contour of the cam 82 is such that it allows the switch 84 to remain open only in normal or stop position as shown.

When the foot-switch 201 is momentarily closed to start the motor 77, the initial movement of the cam 82 also closes the switch 84 and holds it closed after opening of the foot switch, thus keeping the motor energized and causing it to drive the shaft 80 throughout one complete revolution, whereupon the cam 82 again allows the switch 84 to break the circuit and stop the motor 77.

If the toggle switch 177 is opened, as in projection operations hereinafter described, it is evident that no holding circuit can be established by the cam switch 84, and the motor 77 remains solely under control of the switch 177.

The second cam-switch 85 (Figures 1 and 4) is connected in series with the signal lamp 203 across the conductors 206 and 207 via wires 237, 238, and 239 (Figure 16). The cam 83, also mounted on the shaft 80 as previously set forth, is of such contour as to close the switch 85 and thereby cause the signal light 203 to light up during that portion of the revolution of shaft 80 when the previously described shutter 168 is open.

The focusing motor 54 is connected through the reversing switch 180 with the conductors 206 and 207, the normally open push-button switch 182 being interposed in the circuit connection from conductor 206. As the operation and wiring of such reversing switches are well known and have previously been described in connection with elevating motor 87, further detailed description thereof is believed unnecessary repetition herein; it is evident that throwing the switch 180 to upper or lower position conditions the motor circuit for operation of the motor in either desired direction under control of the push-button switch 182.

The operation is as follows:

*Photography*

When it is desired to record images of documents, maps, drawings, or the like, the operator first places a frame of developed film in position on the film-gate 111 under the pressure plate 113, the housing 62 having been previously swung upward and open on its pivots 63 to allow access to the interior of the sub-assembly 61. While the housing is open, the spring-pressed fulcrum pin 124 (Figures 5 and 6), may be withdrawn to the left, releasing the shank 118 so that the pressure plate 113 may be swung upward clear of the film 107 and gate 111 to facilitate positioning the film. This process is then reversed. The housing 62 is closed down, and the "enlarger" switch 178 is closed, thereby turning on the projection lamp 65. The operator next depresses the foot-switch 201, starting the shutter control motor 77 and allowing the latter to run under control of the cam-switch 84 until the shutter reaches wide-open position. At this point the manual switch 177 is opened to stop the motor 77, leaving the shutter in open position, the pressure plate having meanwhile been lowered into engagement with the film by the spring 121, Figure 7.

The shutter 168 being open, light passes from the lamp 65 to the inclined mirror 67, thence downward through the condensing lens system 64, the shutter sub-assembly 61 and the film therein, and the lens 52, an image of the developed film frame being projected on the table 34 or on a sheet of material spread thereon. The operator then manipulates the elevator switch 179 and push-button 181 to lower or raise the carriage and camera-projector by means of the motor 87 until the projected image covers the desired area. The operator similarly manipulates the switches 180 and 182, to adjust the lens 52 by means of the focusing motor 54 until the image is sharply focused. The foregoing field and focus adjustments may be made with the image projected directly on the sheet to be photographed or on a suitable blank sheet of proper size.

The document, drawing, or the like, having been secured to the table 34 by any suitable means such as tacks, tape, or weighted retainers, and the previously described field and focus adjustments having been made, the lamp 65 is extinguished by opening the switch 178 and the shutter switch 177 is closed, the latter causing the motor 77 to be energized through the cam-switch 84 as previously described. The motor 77 runs until the cam 82 opens the switch 84 in normal position as shown in Figure 3, thereby closing the shutter. The operator replaces the developed film with unexposed film, threading the latter from the reel 105, through the control sub-assembly 61, as shown in Figures 5 and 6, and to the take-up reel 106; the housing 62 is again lowered into closed position to exclude light.

It will be understood the above described preparatory field and focus setting need be performed only once, at the beginning of a series of photographic recordings of similar size.

To photograph the document spread on the table 34 the lights 194 are turned on by closing the switch 185 and if required the intensity of illumination is adjusted by means of the variable transformer 187, either to a pre-determined setting of the handle 190 or by use of any suitable light meter. The operator then momentarily closes the foot-switch 201 to start the shutter motor 77, the cam-switch 84 thereafter causing the motor to drive the shaft 80 until one complete revolution is completed as previously set forth.

During the single revolution noted, the notch or opening 173 of the shutter 168 traverses the optical path between the lens 52 and the film 107, allowing the lens to cast an illuminated image of the document on the film during a pre-determined length of time to effect the exposure. During the remainder of the revolution of shaft 80 after closure of the shutter, the cams 128 and 148 respectively raise the pressure plate 113 from the film 107 and disengage the detent 151 from the notch 149 or 150, thereby causing the sprocket 130 to move the film forward one frame in the manner previously explained. The single revolution of the shaft 80, Figure 5, thus effects the exposure and conditions the apparatus for the next exposure. The operator removes the first document or other subject photographed from the table 34, places the second in the same position, and again depresses the foot-switch 201 to photograph the second subject, and proceeds in the manner described to record the desired series of subjects on successive frames of the film 107.

As noted previously, an entire series of subjects may be photographed after a single initial setting of the field and focus. However, once a certain desired field and focus setting have been arrived at for a given size of subject, no initial projection is necessary thereafter in order to arrive at this setting for later recordings, due to the provision of the height scale 96, Figures 1 and 2, and the focal setting. When the operator has initially arrived at the proper field and focal settings as described, he may observe and note down the readings of the scale 96 and the focal setting. Thereafter, when it is desired to photograph further subjects of the size or series noted, or to reproduce the subjects by projection as hereinafter described, it is only necessary to operate the elevating and focusing switching means until the previously noted height and focal readings are obtained. Similarly, subjects of different areas may be photographed in series without intermediate test setting or focusing, simply by manipulating the elevating and focusing controls to bring the scale and counter readings to previously determined proper figures for the various sized subjects. In case of series photographing of widely differing fields or areas, and consequent lens distance, it may also be desirable to vary the intensity of the illumination by manipulation of the transformer control handle 190 as previously described.

It will be noted that all of the foregoing operations may be effected by the user from a single position in front of the table 34, the normal functions of setting camera height, setting the focus, setting the illumination, making the exposure, and resetting the film being carried out by remote control from the panels 175 and 176. Even the manual operation of changing or adjusting the film 107 in the camera may be carried out from the same position, since the camera may be lowered to extreme bottom position directly in front of the operator, the proper original height being afterward restored, as previously noted, from the scale 96. It is obvious that provision of the described complete remote control from a single position adapts the device to rapid and easy operation with a minimum of fatigue for the user.

*Reproduction*

When it is desired to reproduce previously photographed subjects, the developed film carrying the images is threaded into the camera-projector 42 in the manner previously described for insertion of raw film. The projection lamp 65 is turned on, the shutter 168 is again opened by manipulation of switches 177 and 201, and the proper camera height and focus are arrived at either by direct test projection on a blank sheet on the table 34 or by setting to height and focal indicating figures previously noted at the time of photographing the particular subject to be reproduced. The time switch, 183, having been set for the desired period of exposure, the switch 178 is opened to extinguish the lamp 65 and a suitable sheet of sensitized paper or the like is secured in proper position on the table 34.

The time switch 183 is tripped by means of its button 184, the switch closing and remaining closed for the predetermined time in the usual manner of such switches. The lamp 65 is thereby illuminated during the pre-determined period, during which period the enlarged image from the film 107 is projected on the sensitized sheet. When the time-switch 183 has again extinguished the lamp 65 the sensitized sheet is removed for development and/or fixing in the usual manner. In case a succeeding image on the film strip is to be reproduced, switches 177 and 201 are operated until the shutter motor 77 has closed and again reopened the shutter 168, during which operation the film has been advanced one frame in the manner previously described, after which a second sensitized sheet is placed in position and the second projection exposure made as set forth.

In case it is desired to make more than one print from the same film frame, the operator simply changes the sensitized sheets and effects the exposures by repeated trippings of the time switch 183 without intermediate closings of the shutter 168.

All the described reproducing operations are carried out from the single operating position, and except of course for changing the sensitized paper, all are done by remote control, with the same advantages of speed, ease and precision noted with respect to recording.

While the apparatus is adapted to reproduction in the precise original size, it is obvious that enlargement or reduction in the reproduction may readily be made by proper setting of camera-projector height and focus.

From the foregoing description it will be seen that the invention makes possible the photographic recording and reproduction with maximum rapidity, precision and accuracy, guesswork being eliminated. The accuracy is augmented by the fact that reproduction takes place by projection through the same lens and, if desired, with the identical setting used in the original photographic recording. Thus any defects, such as optical aberration or blurs impressed on the film for any reason, even such as slight optical defects in the lens, are automatically cancelled out and corrected by reversal in the projection through the same lens; the results are thus uniformly sharp reproductions of the originals.

A convenience outlet 240, connected to the conductors 206 and 207, Figure 24, may be provided at any suitable location on the device, for supplying current to any auxiliary electrical apparatus, such as extension lights or the like, which it may be desired to use in connection with the apparatus.

While the invention has been described in preferred form it is not limited to the precise structures illustrated, as various modifications and changes may be made without departing from the scope of the appended claims.

What is claimed is:

1. In a camera projector, a horizontal rectangular frame having vertical sides, a web within said frame and joining said sides to divide said frame into an upper and a lower compartment, a film gate formed in said web, a transparent pressure plate in said upper compartment, a holder for said pressure plate, a yoke on which said holder is trunnioned, a lever supported on said web in said upper compartment and carrying said yoke, a plunger reciprocally mounted in said web and having its upper end pivotally connected to said lever, spring means urging said plunger and imparting said urge via said lever to said pressure plate, an intermittent movement for moving said film through said gate, and cam means in said lower compartment connected to said movement and adapted to move said plunger against the urge of said spring and separate the pressure plate from said film gate while said film is moving therethrough.

2. In a camera projector, a horizontal rectangular frame having vertical sides, a web within said frame and joining said sides to divide said frame into an upper and a lower compartment, a film gate formed in said web, a transparent pressure plate in said upper compartment, a holder for said pressure plate, a yoke on which said holder is trunnioned, a lever supported on said web in said upper compartment and carrying said yoke, a plunger reciprocally mounted in said web and having its upper end pivotally connected to said lever, spring means urging said plunger and imparting said urge via said lever to said pressure plate, an intermittent movement for moving said film through said gate, a lever pivotally supported in said lower compartment and having a free end operatively connected to said plunger, and cam means in said lower compartment connected to said movement and adapted to engage and move said lever, thereby moving said plunger against the urge of said spring and separating the pressure plate from said film gate while said film is moving therethrough.

3. In a camera projector, a horizontal rectangular frame having vertical sides, a web within said frame and joining said sides to divide said frame into an upper and a lower compartment, a film gate formed in said web, openings formed in opposite walls of said frame in alignment with said film gate and providing passage therethrough for said film, a transparent pressure plate in said upper compartment, a holder for said pressure plate, a yoke on which said holder is trunnioned, a lever supported on said web in said upper compartment and carrying said yoke, a plunger reciprocally mounted in said web and having its upper end pivotally connected to said lever, spring means urging said plunger and imparting said urge via said lever to said pressure plate, a shaft in said upper compartment, an intermittent movement for moving said film through said gate, a lever in said lower compartment having one end pivotally supported therein and having its other end operatively connected to said plunger, said lever also having a step formed intermediate the ends thereof, and a cam carried on a shaft journalled in said lower compartment, said shaft being geared to said first shaft, said cam acting against said step for moving said lever and in turn moving said plunger against the urge of said spring to separate the pressure plate from said film gate while said film is moving therethrough.

VERNEUR E. PRATT.